United States Patent
Gershinsky et al.

(10) Patent No.: US 7,958,257 B2
(45) Date of Patent: Jun. 7, 2011

(54) MESSAGE FILTERING AND DEMULTIPLEXING SYSTEM

(75) Inventors: Gidon Gershinsky, Haifa (IL); Avraham Harpaz, Haifa (IL); Nir Naaman, Haifa (IL); Yoav Tock, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 1383 days.

(21) Appl. No.: 11/039,583

(22) Filed: Jan. 19, 2005

(65) Prior Publication Data

US 2006/0159096 A1   Jul. 20, 2006

(51) Int. Cl.
*G06F 15/173* (2006.01)
(52) U.S. Cl. .......................... 709/238; 719/313; 370/256
(58) Field of Classification Search .................. 709/224, 709/223, 204, 206, 228, 238, 245; 707/104.1, 707/3; 719/318; 725/116; 705/1; 370/256
See application file for complete search history.

(56) References Cited

U.S. PATENT DOCUMENTS

| | | | |
|---|---|---|---|
| 6,029,195 A * | 2/2000 | Herz | 725/116 |
| 6,138,049 A * | 10/2000 | McLaughlin | 700/67 |
| 6,772,139 B1 * | 8/2004 | Smith, III | 707/3 |
| 7,054,276 B2 * | 5/2006 | Kaplan | 370/256 |
| 7,174,557 B2 * | 2/2007 | Sanghvi et al. | 719/318 |
| 7,406,537 B2 * | 7/2008 | Cullen | 709/238 |
| 2003/0115336 A1 * | 6/2003 | Auerbach et al. | 709/228 |
| 2003/0158897 A1 * | 8/2003 | Ben-Natan et al. | 709/204 |
| 2005/0262203 A1 * | 11/2005 | Buchheit et al. | 709/206 |
| 2006/0031076 A1 * | 2/2006 | Lei et al. | 705/1 |
| 2006/0074980 A1 * | 4/2006 | Sarkar | 707/104.1 |

* cited by examiner

*Primary Examiner* — Dustin Nguyen

(57) ABSTRACT

A publish/subscribe system includes a publisher and multiple subscribers. The published includes a packet generator to generate a packet with at least one of: a fixed length flow label labeling a message or a message bundle and a fixed length node label labeling at least one message bundle and indicating at least one of the nodes of a topic tree to which the flow label belongs. Each received includes a user selection data holder and a message selector. The data holder stores a selection of topics of interest to a user from the topic tree. The message selector receives a packet having a header and data, determines which flow and/or node labels are incorporated in the header and accepts the data if the user selection data holder indicates that the labels within the header are of interest to the user.

12 Claims, 7 Drawing Sheets

MESSAGE FILTERING AND DEMULTIPLEXING SYSTEM

FIELD OF THE INVENTION

The present invention relates to publish/subscribe system generally and to message filtering in such systems in particular.

BACKGROUND OF THE INVENTION

A publish/subscribe system is a mechanism where subscribers express interest in future information by some selection criterion, publishers provide information, and the mechanism delivers the information to all interested subscribers. Current publish/subscribe systems organize information around topics (also called channels, subjects or streams). Providers or publishers publish events to topics and consumers or subscribers subscribe to all data from a particular topic.

Exemplary publish/subscribe systems are stock data systems (the stock exchange publishes the stock ticker and the subscribers choose which stocks they are subscribed to) and cable television systems (the cable companies publish the channels and the subscribers choose which channels to pay for. Usually, the subscribers choose set packages of channels).

The publisher may define a large number of topics and the topics may be organized hierarchically in a tree to reflect the information structure and to facilitate user access control. Topics, or information delivery channels, are mapped to the underlying network infrastructure, based either on multicast transport or unicast transport, or on a combination of the two. Several topics are often transmitted over one multicast group. Moreover, in order to reduce processing and networking overhead, messages from different topics are typically packed into a single network packet. The latter is described in an article by Carmeli, B et al., "High Throughput Reliable Message Dissemination", *Symposium on Applied Computing*, March 2004 and in U.S. patent application Ser. No. 10/699,081 entitled "Minimal Delay Transmission of Short Messages".

Subscribers who are interested in a topic join the multicast group where the topic is transmitted. Unfortunately, the subscribers not only receive the messages from their topic of interest but they also receive messages on other topics transmitted with the same group. These latter messages need to be filtered out by the receiving device at the subscriber. Typically, the filtering process may apply a pattern matching or regular expression filter on the "Topic Name" (a string header-field) to reject or accept a message, for every message individually. Such a filter is described in U.S. Pat. No. 5,557,798 to Skeen et al.

Unfortunately, topic names are often long strings, usually of variable length, which renders pattern matching a demanding procedure. Moreover, the topic name is also used to demultiplex the message; that is, to deliver it to the correct consumer in the application layer. This task is not unique to multicast; in unicast transport, multiple topics are often sent over a single connection to each client and each client has to demultiplex the data to its application subscribers. Regardless of transport type, the long, variable length topic strings are ill-suited for demultiplexing. Often, the processing load required for topic-based message filtering and demultiplexing in receivers becomes the performance bottleneck, precluding the system from meeting application throughput requirements. These requirements are particularly tight in front-offices of the financial sector since the latter are characterized by high data flow volumes.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
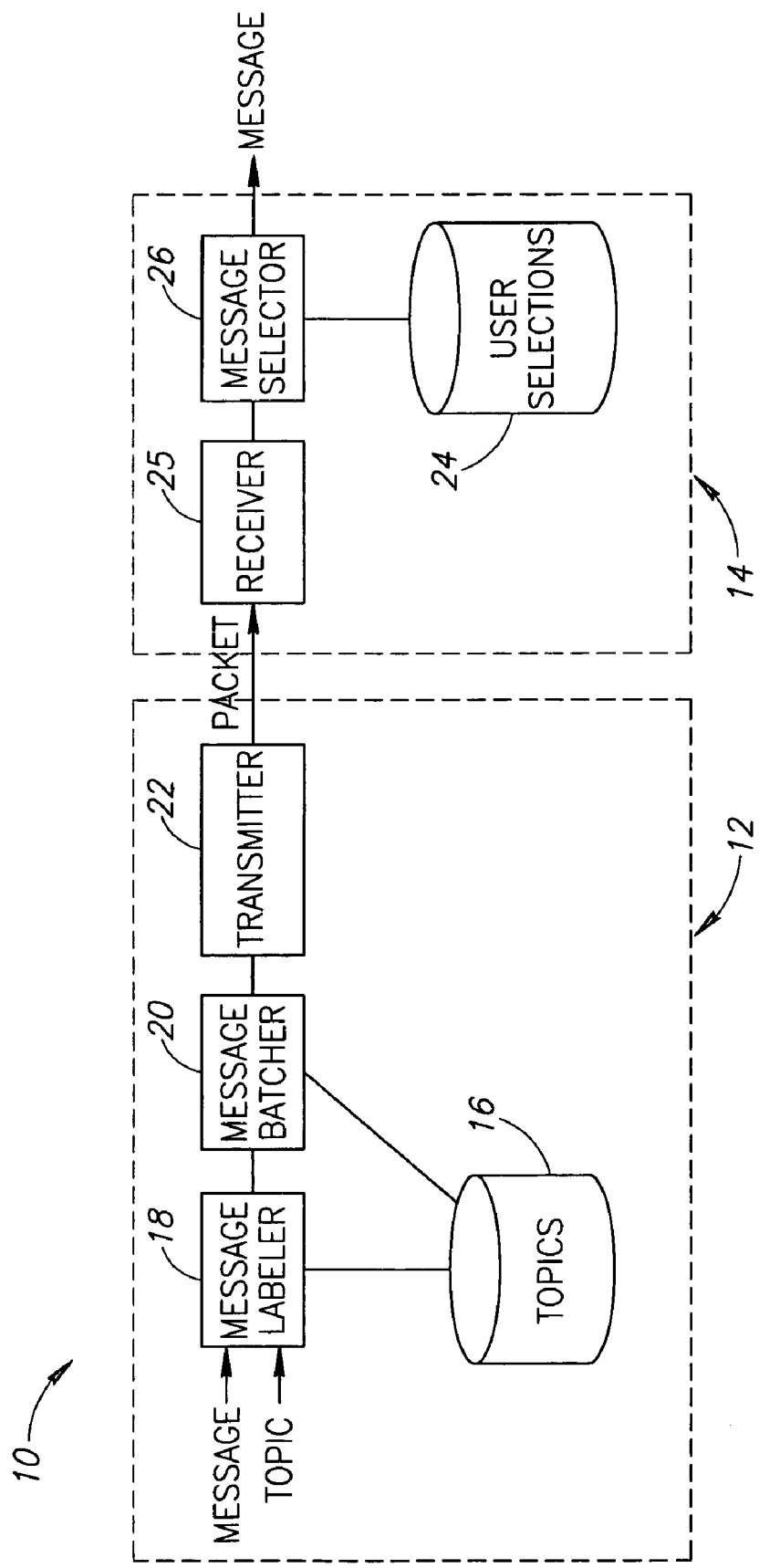
FIG. 1 is a block diagram illustration of a publish/subscribe system, constructed and operative in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

SUMMARY OF THE PRESENT INVENTION

The present invention provides an improved publish/subscribe system that does not utilize topic names formed of strings.

There is therefore provided, in accordance with a preferred embodiment of the present invention, a publisher in a publish/subscribe system. The publisher includes a packet generator to generate a packet with at least one of: a fixed length flow label labeling a message or a message bundle and a fixed length node label labeling at least one message bundle and indicating at least one of the nodes of a topic tree to which the flow label belongs.

Additionally, in accordance with a preferred embodiment of the present invention, the packet generator includes a topic data holder, a message labeler and a message batcher. The topic data holder stores the topic tree (the flow labels indicate topics and the node labels indicating nodes which group the topics). The message labeler labels a message having a topic with a flow label associated with the topic. The message batcher generates a message bundle from one or more messages with the same flow label and labels at least one bundle with one or more node labels associated with the nodes to which the flow label belongs.

Moreover, in accordance with a preferred embodiment of the present invention, the message batcher includes a message nester to generate a nested bundle of multiple message bundles whose flow labels are associated with the same node labels.

Further, the topic tree includes a semantic tree of nodes and flows. The topic tree may include a virtual tree of nodes and flows. The virtual tree may reflect the subscription activity of users and/or system requirements.

There is also provided, in accordance with a preferred embodiment of the present invention, a receiver which includes a user selection data holder and a message selector. The user selection data holder stores a selection of topics of interest to a user from the topic tree. The message selector receives a packet having a header and data, determines which flow and/or node labels are incorporated in the header and accepts the data if the user selection data holder indicates that the labels within the header are of interest to the user.

Additionally, in accordance with a preferred embodiment of the present invention, the user selection data holder includes at least a node label reject list and a flow label accept list.

Moreover, in accordance with a preferred embodiment of the present invention, the message selector includes a message extractor, a header reader and a header comparer. The message extractor extracts at least one message from the packet when so indicated. The header reader reads the flow and/or node labels. The header comparer compares the node labels with the node label reject list and the flow labels with the flow label lists and indicates to the message extractor to throw away the packet when either the node label reject list includes the node label or the flow label reject list includes the flow label.

There is provided, in accordance with a further preferred embodiment of the present invention, a method including transmitting messages from a content publisher with fixed length labels, the labels including flow labels indicating topics and node labels indicating nodes which group the topics.

There is still further provided, in accordance with yet another preferred embodiment of the present invention, a method including having a user selection data holder to store a selection of topics of interest to a user from a topic tree of fixed length labels and receiving a packet having a header and data, to determine which flow and/or node labels are incorporated in the header and to accept the data if the user selection data holder indicates that the labels within the header are of interest to the user.

There is still further provided, in accordance with a preferred embodiment of the present invention, a computer product readable by a machine, tangibly embodying a program of instructions executable by the machine to perform method steps including transmitting messages from a content publisher with fixed length labels, the labels including flow labels indicating topics and node labels indicating nodes which group the topics.

Finally, there is provided, in accordance with a preferred embodiment of the present invention, a computer product readable by a machine, tangibly embodying a program of instructions executable by the machine to perform method steps including having a user selection data holder to store a selection of interest to a user from a topic tree of fixed length labels and receiving a packet having a header and data, to determine which flow and/or node labels are incorporated in the header and to accept the data if the user selection data holder indicates that the labels within the header are of interest to the user.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Reference is now made to FIG. 1, which illustrates a publish/subscribe system 10, constructed and operative in accordance with the present invention, operating between a publisher 12 and multiple subscribers 14. For clarity, only one subscriber 14 is shown in FIG. 1.

On the publisher side, system 10 may comprise a topic data holder 16, a message labeler 18, a message batcher 20 and a transmitter 22. On the subscriber side, system 10 may comprise a receiver 25, a user selection data holder 24 and a message selector 26.

Topic data holder 16 may be any suitable data holder and may be memory- or disk-based. Data holder 16 may embody a hierarchy of topics available from publisher 12. Each topic may have a first type of label associated with it, known as a "flow label", and each group of topics may have a second type of label associated with it, known as a "node label". Each label may be an N-bit integer label, where N depends on the number of labels needed to cover all topics. For example, for the stock ticker application, there may be more than 100,000 topics and 10,000 groups of topics. Thus, N may be 32 bits.

Message labeler 18 may receive a message to be transmitted and its topic, may search topic data holder 16 to determine the flow label associated with the topic and may label the message with the generated flow label. Message batcher 20 may batch together multiple messages, if necessary. Batcher 20 may batch together messages with the same flow label (i.e. from the same topic) or messages with different flow labels but with the same associated node label (i.e. from the same group of topics). To do the latter, batcher 20 may search topic data holder 16 to determine which flow labels are associated with which node labels. Batcher 20 may provide the batched messages to transmitter 22 as a packet to be transmitted on a network to subscribers 14.

On the subscriber side, each user may list the topics to which s/he may be interested, which may be stored in user selection data holder 24. Data holder 24 may be memory based. When a packet may arrive at receiver 25, it may provide the received packet to message selector 26 which, in turn, may find the flow and/or node labels present in the received packet. Selector 26 may compare the flow and/or node labels of the packet with those in user selection data holder 24 and may transfer on only those messages in the packet which have the user's selected flow labels.

Figure 2A:
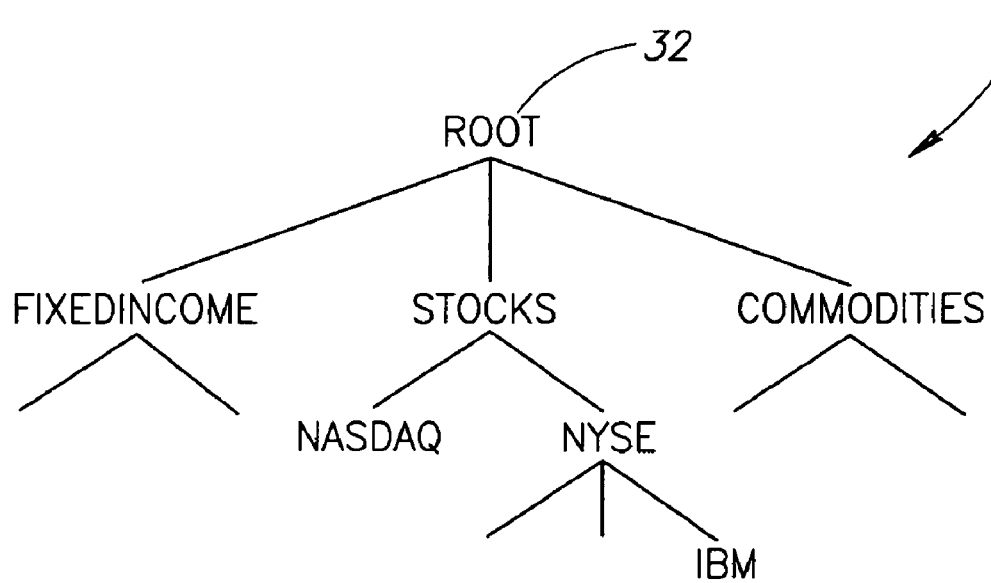
FIGS. 2A and 2B are schematic illustrations respectively of an exemplary topic hierarchy and its associated node and flow label tree, useful in understanding the operation of the system of FIG. 1.
Figure 2B:
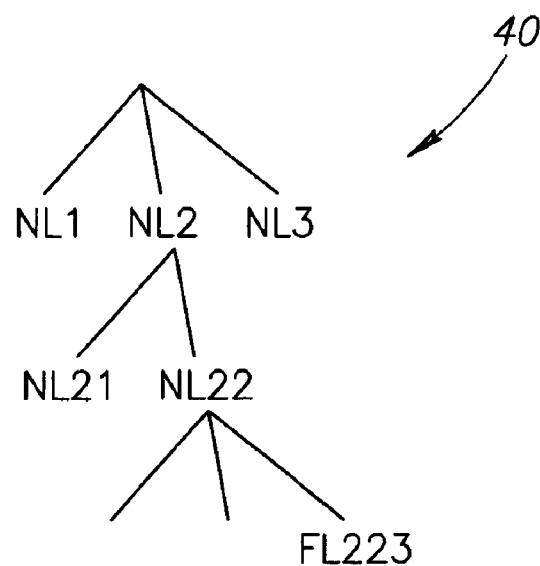

Reference is now made to FIGS. 2A and 2B, which respectively illustrate an exemplary topic hierarchy or topic tree 30 for an investment company or a financial brokerage and its associated node and flow label tree 40. Hierarchy 30 has a root 32 from which nodes branch into the various types of financial instruments. One node is labeled FixedIncome, another is labeled Stocks and a third is labeled Commodities. From each node, more branches extend. In particular, the Stocks node has branches NASDAQ and NYSE and under the NYSE node there are multiple leaves, of which one, IBM, is labeled.

Node and flow label tree 40 may have the same tree structure as hierarchy 30; however, the labels for the branches and leaves are different. For example, the nodes FixedIncome, Stocks and Commodities may be nodes NL1, NL2 and NL3 in tree 40, the nodes NASDAQ and NYSE may be nodes NL21 and NL22 and the IBM leaf may be flow FL223.

A subscriber interested in the IBM stock may register that interest with message selector 26. Message selector 26 may then store, in user selection data holder 24, the flow label FL223 associated with the IBM leaf as well as the node labels NL22 and NL2 associated with the NYSE and Stocks nodes to which the IBM leaf belongs.

Other labeling schemes for nodes and flows may exist. For example, reference is now briefly made to FIG. 3, which illustrates a simple tree where the nodes and flows are labeled in order. Thus, node NL3 branches from node NL1, flows FL1 and FL2 flow from node NL3, flows FL3 and FL4 branch from node NL1 and flows FL5 and FL6 branch from node NL2.

Each label may be an integer with a fixed number N of bits. In one embodiment of the present invention, the most significant bit (i.e. bit N−1) may be the bit to differentiate between flow labels and node labels. The N−2 bit may be reserved for nested labeling, which will be explained hereinbelow. The remaining N−2 bits may be used to create a set of $2^{N-2}$ unique label numbers of each type. Each flow may be assigned a unique flow label. Some, none, or all of the nodes in hierarchy 30 (FIG. 2A) may be assigned unique node labels.

Figure 4:
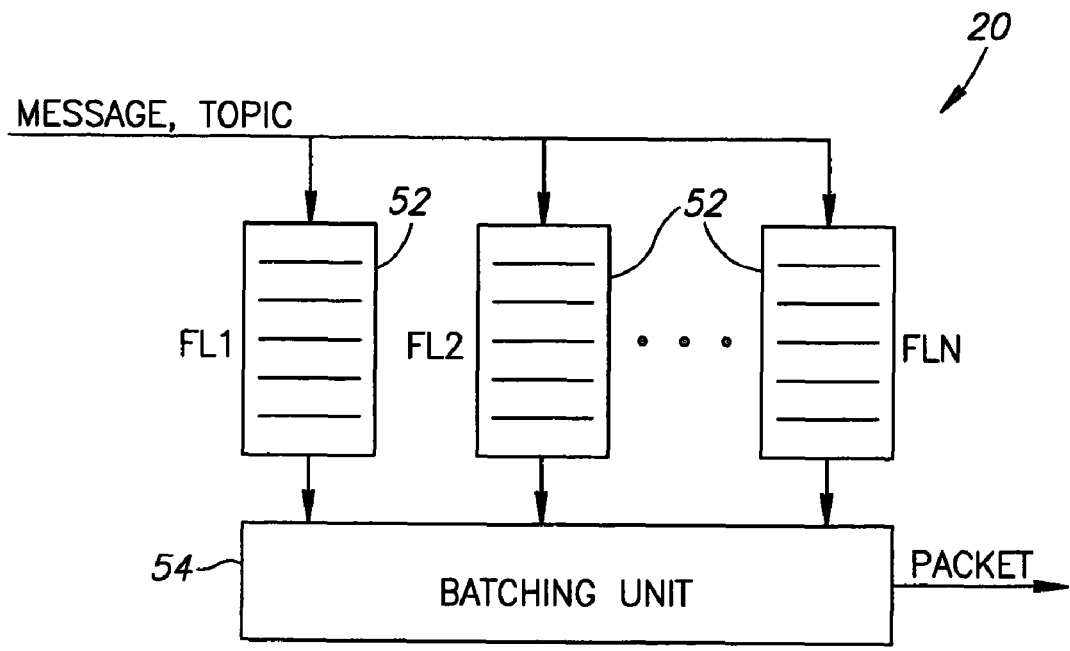
FIG. 4 is a block diagram illustration of a message batcher forming part of a publisher of FIG. 1.

Reference is now made to FIG. 4, which details message batcher 20. Message batcher 20 may comprise a large plurality of queues 52, one per topic (i.e. flow), and a batching unit 54. Message batcher 20 may receive a message and its topic from message labeler 18 and may place the message into its associated queue 52. Batching unit 54 may batch messages as described in U.S. patent application Ser. No. 10/699,081 entitled "Minimal Delay Transmission of Short Messages", which application is incorporated herein by reference.

Batching unit 54 may take messages from queues 52 in any suitable manner so as to create a packet. For example, batching unit 54 may take messages from only one queue 52 at a time, or, if a queue 52 does not have a sufficient number of messages waiting, unit 54 may take some messages from one queue 52 and some from one or more other queues 52. This is illustrated in FIGS. 5, 6, 7 and 8, to which reference is now made.

Figure 5:
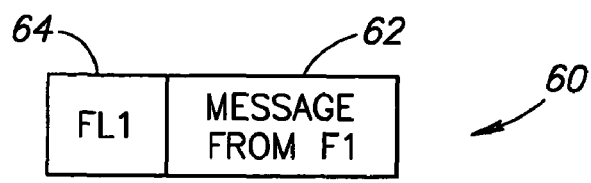
FIGS. 5, 6, 7 and 8 are schematic illustrations of alternative embodiments of packets generated by the message batcher of FIG. 4.

In the simplest case, shown in FIG. 5, batching unit 54 may take only one message at a time with its flow label. The resultant simple packet 60 comprises the message, labeled 62, headed by a header 64 of flow label FL1.

Figure 6:
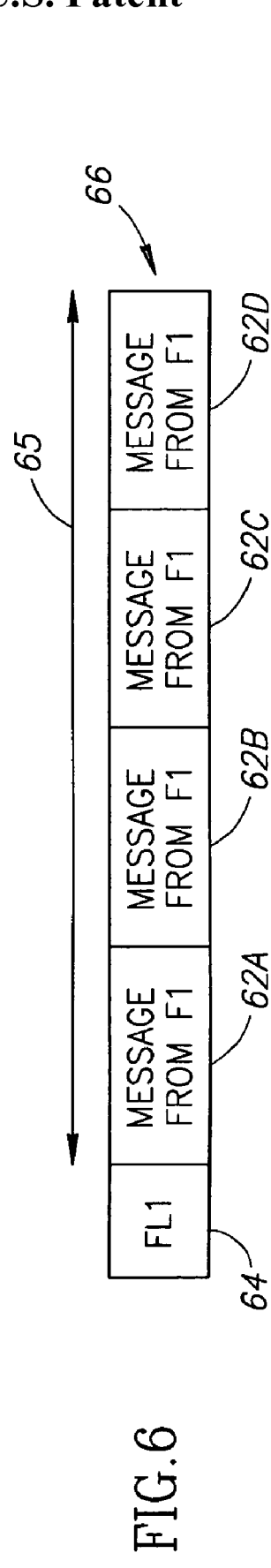

In an alternative case, batching unit 54 may combine a multiplicity of messages 62 together. In the first embodiment of this, shown in FIG. 6 as a packet 66, four messages, labeled 62A, 62B, 62C and 62D, from the same topic are batched together. This is known as a "bundle" 65. Batching unit 54 may arrange messages 62A-62D in the appropriate order (such as by time of arrival) and may add header 64, with the flow label FL for the topic, at the beginning of bundle 65. FIG. 6 shows this flow label as FL1.

Batching unit 54 may utilize the hierarchy stored in topic data holder 16 to transmit node labels NL as well. This may improve the filtering process in receiver 25. For example, if a user is not interested in the topics of a segment of the hierarchy, then receiver 25 may reject the topics using the node label NL associated with that segment of the hierarchy (rather than the individual flow labels FL).

Figure 7:
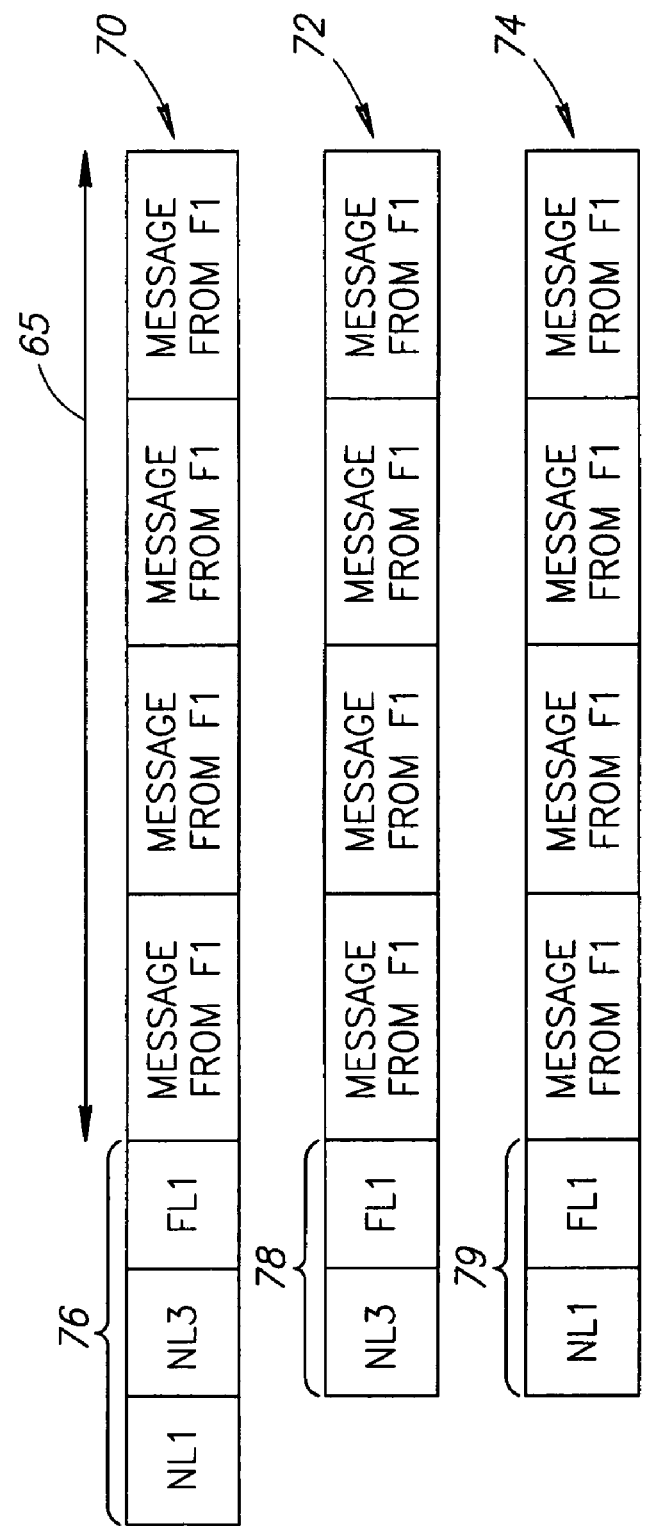

In this embodiment, message batcher 20 may precede each message 62 (or bundle 65) by a variable number of node labels (zero or more), followed by a single flow label. This is shown in FIG. 7, which shows three alternative packets 70, 72 and 74, for bundle 65. Packets 70-74 refer to the hierarchy of the tree of FIG. 3.

In packet 70, the header, here labeled 76, includes two node labels NL1 and NL3 and flow label FL1. This is because flow FL1 in FIG. 3 branches from node NL3 which branches from node NL1. Thus, flow FL1 is part of both nodes.

Batching unit 54 may, alternatively, create packets 72 and 74 for flow FL1. In packet 72, the header, labeled 78, has just node label NL3 and flow label FL1 while in packet 74, the header, labeled 79, has node label NL1 and flow label FL1.

Figure 3:
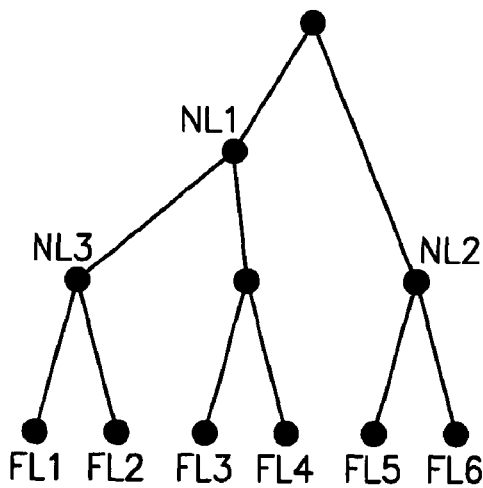
FIG. 3 is a schematic illustration of a simple tree, useful in understanding the operation of the system of FIG. 1.
Figure 8:
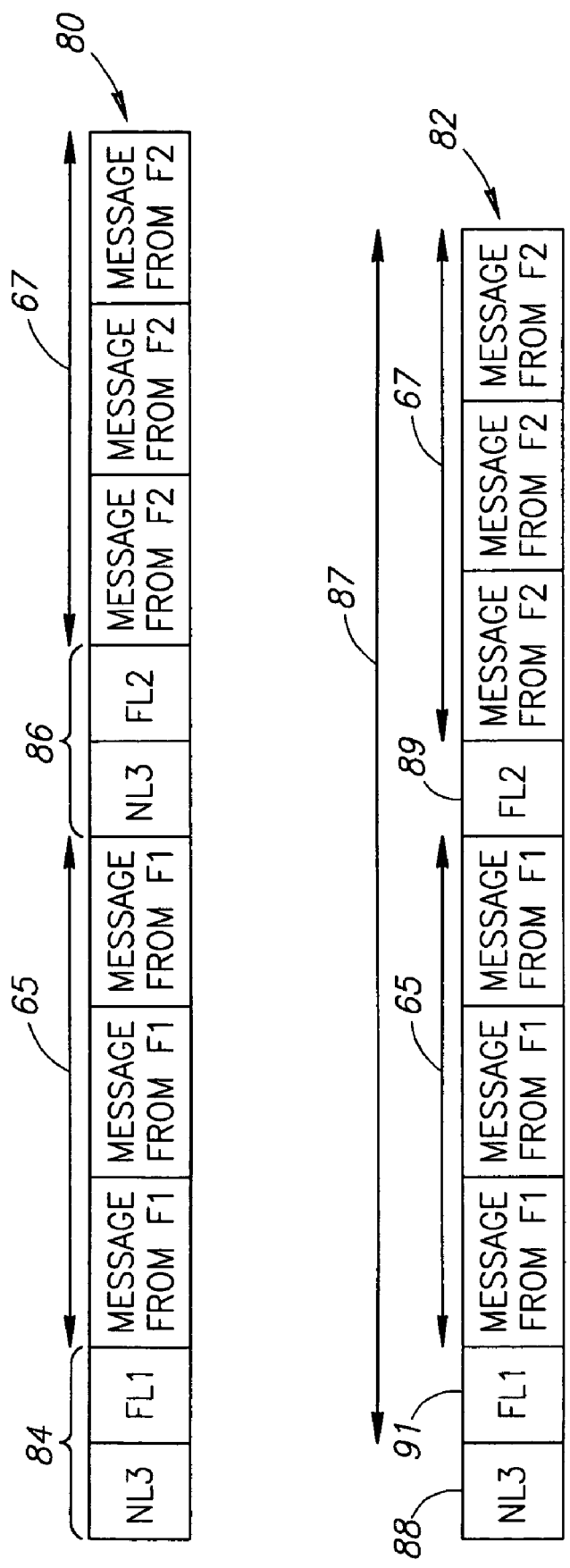

Batching unit 54 may also combine multiple messages or bundles from different flows branching from the same node or nodes. Two exemplary such packets 80 and 82 are shown in FIG. 8. Both packets 80 and 82 have bundle 65 from flow FL1 and a bundle 67 from flow FL2, where flows FL1 and FL2 are as shown in FIG. 3.

In packet 80, bundle 65 is preceded by a header 84 having node label NL3 and flow label FL1 and bundle 67 is preceded by a header 86 having node label NL3 and flow label FL2. To avoid the repetition of node label NL3, batching unit 54 may create a nested bundle 87 formed from bundles 65 and 67, each preceded by their flow labels FL1 and FL2, respectively, as headers 89 and 91. Batching unit 54 may add a header 88, of node label NL3 from which flows FL1 and FL2 branch.

Figure 9:
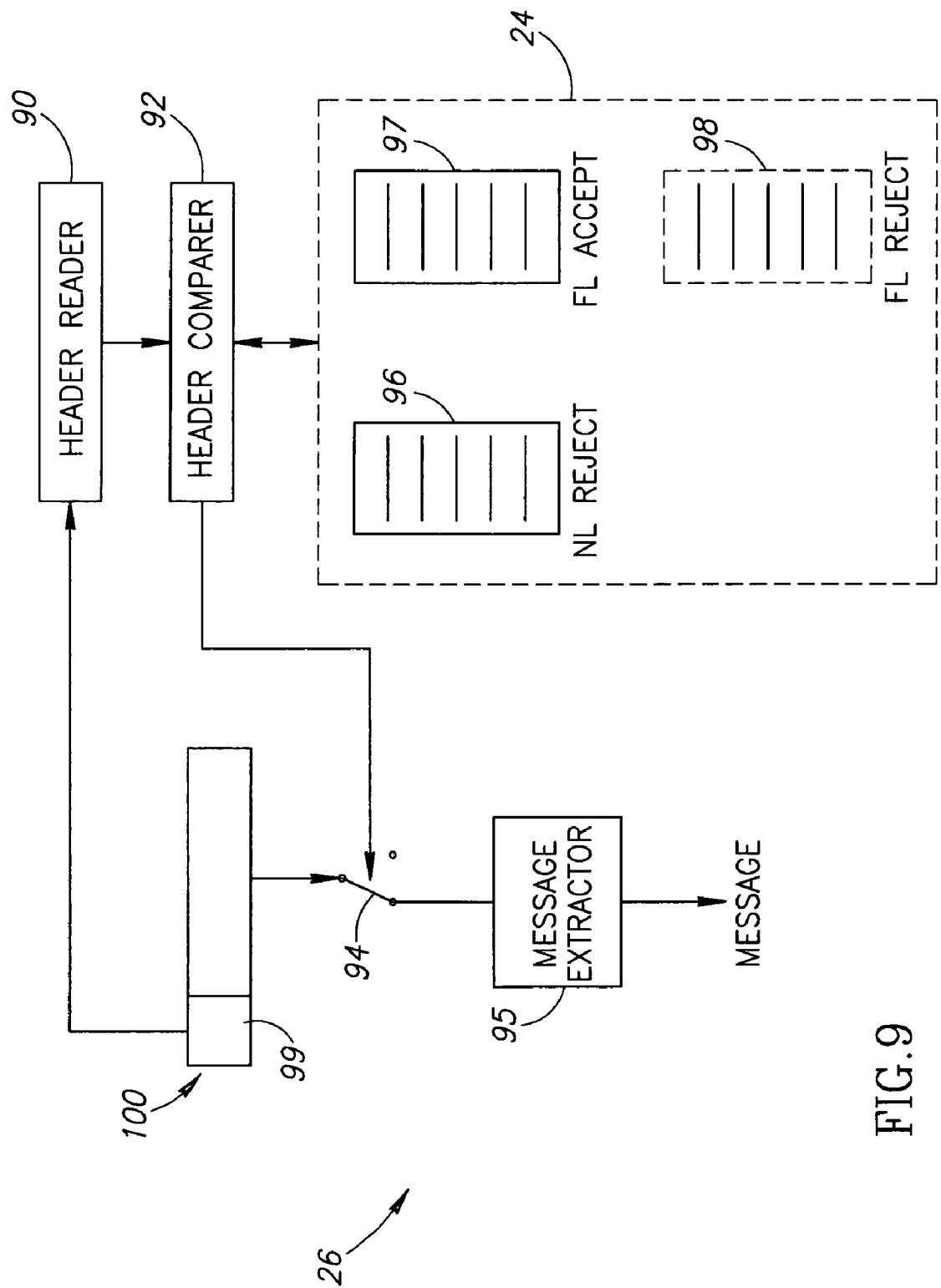
FIG. 9 is a block diagram illustration of a message selector, forming part of a subscriber of FIG. 1.

Reference is now made to FIG. 9, which details message selector 26 and its operation with user selection data holder 24. Message selector 26 may comprise a header reader 90, a header comparer 92, a switch 94 and a message extractor 95. Data holder 24 may comprise an NL rejection list 96, an FL list 97 of interest and an optional FL rejection list 98.

Header reader 90 may read the header, labeled 99, of an incoming packet, labeled 100. The header may be one of the many types shown in FIGS. 5-8, with a variable amount of flow labels FL and node labels NL. For example, headers 64, 89 and 91 have just a flow label, header 76 has two node labels and one flow label, headers 78, 79, 84 and 86 have one node label and one flow label, and header 88 has only one node label.

Header reader 90 may determine which type of header may be present and may read the information carried therein. For example, bit N−1 of header 99 may indicate that the label may be a flow label or a node label. Header reader 90 may provide the label (i.e. bits N−3 to 0) and a node or flow indication to header comparer 92.

If the label is a flow label, then header comparer 92 may compare flow label FL with user data holder 24 to determine if flow label FL may be found in FL list 97 of interest. If flow label FL was found in FL list 97, then header comparer 92 may indicate to switch 94 to pass packet 100 to message extractor 95, which, in turn, may split packet 100 into its component messages and may pass them to the application.

If the label is a node label, then header comparer 92 may compare node label NL with data holder 24 to determine if node label NL may be found in NL rejection list 96. If it is found in list 96, then header comparer 92 may clean packet 100 from memory. This is indicated in FIG. 9 by the connection of switch 94 to nothing.

However, if node label NL is not found in NL rejection list 96, then header comparer 92 may request that header reader 90 read the next label in header 99. The process may continue until a flow label is found.

If bit N−2 indicates that there is nested labeling, then node label NL refers to a nested bundle, e.g. bundle 87 in FIG. 8. If node label NL is not found in NL rejection list 96, then header comparer 92 may request that header reader 90 divide nested bundle 87 into its component message bundles 65 and 67 and read the flow labels FL one at a time.

If a subscriber 14 does not yet have the full list of accepted flow labels, such as upon startup, header comparer 92 may ask its application or its user whether to accept or reject each new or unknown flow label that it receives. In this way, header comparer 92 may build FL list 97 gradually. Optionally, header comparer 92 may utilize FL rejection list 98 to save subscriber 14 from having an expensive interaction with the application or the user for the undesired flow labels it has already seen.

In FIGS. 2A, 2B and 3, node labels NL were given to nodes in a semantic topic tree. However, the semantic hierarchy does not always provide a good segmentation of the flows. For example, half the users might be interested in topics FL1, FL3 and FL5 of FIG. 10, to which reference is now made, while the other half might be interested in topics FL2, FL4 and FL6. In this situation, node labels NL3 and NL4 may not be very useful for rejection of messages on these topics.

Figure 10:
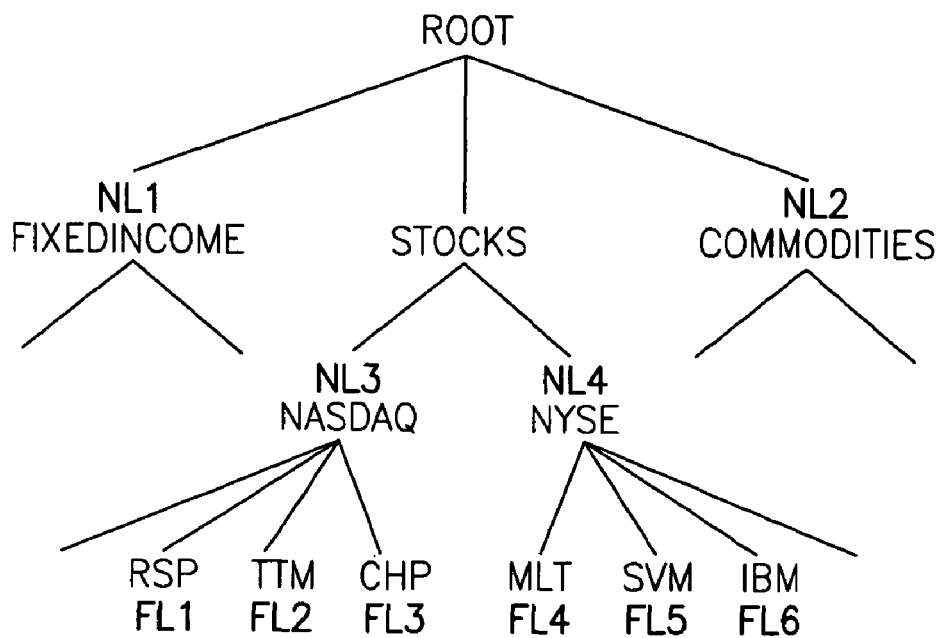
FIGS. 10 and 11 are schematic illustrations of alternative virtual trees, useful in the system of FIG. 1.
Figure 11:
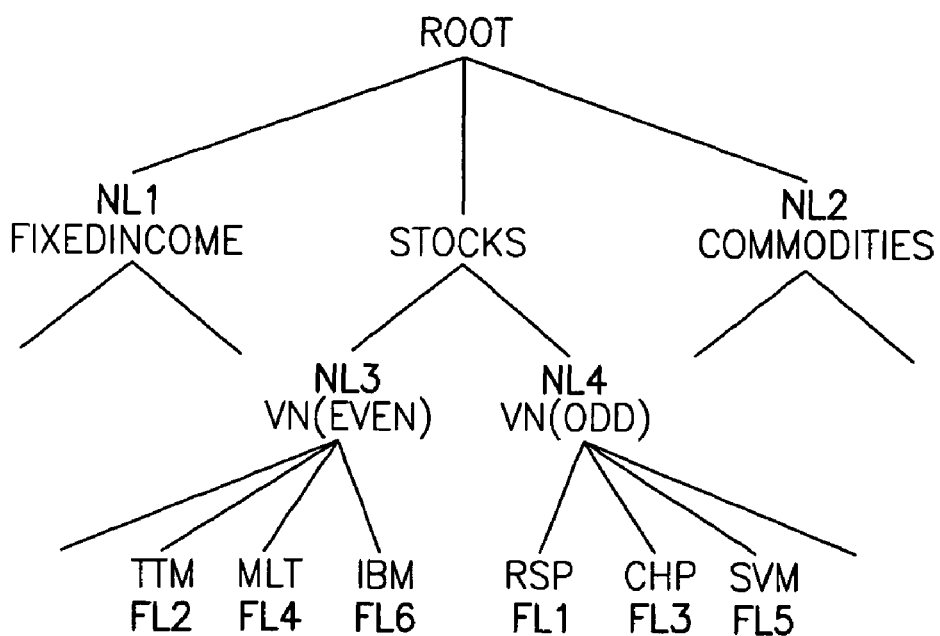

In accordance with a preferred embodiment of the present invention, a different virtual topic tree from the semantic one of FIG. 10 may be generated, so as to provide more efficient filtering. An example of this might be the tree shown in FIG. 11, to which reference is now made. In this example, node label NL3 may branch to all even flow labels and node label NL4 may branch to all odd flow labels. Thus, the flow labels may remain, but the node labels may reflect a virtual tree constructed to enhance filtering. Using the tree of FIG. 11, "even" receivers may utilize NL4 to reject "odd" flows.

Other situations may generate other types of virtual topic trees. For example, the initial topic tree may be flat (that is, no initial hierarchy may exist). A virtual hierarchy may be generated from the subscription activity of the users. The node labels may be used to build virtual trees in any suitable manner that may segment the topics in a manner that may reflect various system requirements rather than semantic structure.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of message filtering in a publish/subscribe system, comprising the steps of:
   arranging a plurality of topics in a semantic hierarchical tree comprising first nodes that represent semantic information of the plurality of topics;
   responsively to predetermined optimization requirements rearranging the semantic hierarchical tree to form a virtual topic tree having branches by adding second nodes therein to thereby regroup the plurality of topics;
   establishing first and second nodal associations between a stream of messages and respective first nodes and second nodes of the virtual topic tree, respectively, according to conformance of the messages with the branches of the virtual topic tree;
   in a computing apparatus segmenting the stream of messages into bundles of messages having at least one common first and second nodal association, the bundles further comprising flow labels and node labels that specify the at least one common first and second nodal association, respectively; and
   transmitting the bundles to a receiver adapted for filtering of the messages therein responsively to the flow labels and the node labels.

2. The method according to claim 1, wherein each of the flow labels has a first identical fixed length and each of the node labels has a second identical fixed length.

3. The method according to claim 1, wherein the optimization requirements comprise subscription activity of users of the receiver.

4. The method according to claim 1, wherein the optimization requirements comprise requirements of at least one of the computing apparatus and the receiver.

5. A computer software product, including a non-transitory computer-readable storage medium in which computer program instructions are tangibly embodied, which instructions, when executed by a computer, cause the computer to perform a method of message filtering in a publish/subscribe system, comprising the steps of:
   arranging a plurality of topics in a semantic hierarchical tree comprising first nodes that represent semantic information of the plurality of topics;
   responsively to predetermined optimization requirements rearranging the semantic hierarchical tree to form a virtual topic tree having branches by adding second nodes therein to thereby regroup the plurality of topics;
   establishing first and second nodal associations between a stream of messages and respective first nodes and second nodes of the virtual topic tree, respectively, according to conformance of the messages with the branches of the virtual topic tree;
   segmenting the stream of messages into bundles of messages having at least one common first and second nodal association, the bundles further comprising flow labels and node labels that specify the at least one common first and second nodal association, respectively; and
   transmitting the bundles to a receiver adapted for filtering of the messages therein responsively to the flow labels and the node labels.

6. The computer software product according to claim 5, wherein each of the flow labels has a first identical fixed length and each of the node labels has a second identical fixed length.

7. The computer software product according to claim 5, wherein the optimization requirements comprise subscription activity of users of the receiver.

8. The computer software product according to claim 5, wherein the optimization requirements comprise requirements of at least one of a computing apparatus and the receiver.

9. A data processing system for message filtering in a publish/subscribe system, comprising:

a processor;

a memory accessible to the processor storing programs and data objects therein, the data objects and programs including a topic data holder, a message labeler, and a message batcher, wherein execution of the programs cooperatively cause the processor to perform the steps of:

storing a plurality of topics in the data holder;

arranging the plurality of topics in a semantic hierarchical tree comprising first nodes that represent semantic information of the plurality of topics;

responsively to predetermined optimization requirements rearranging the semantic hierarchical tree to form a virtual topic tree having branches by adding second nodes therein to thereby regroup the plurality of topics;

establishing first and second nodal associations between a stream of messages and respective first nodes and second nodes of the virtual topic tree, respectively, according to conformance of the messages with the branches of the virtual topic tree;

with the message labeler establishing flow labels and node labels for the first nodes and the second nodes, respectively;

with the message batcher segmenting the stream of messages into bundles of messages having at least one common first and second nodal association, the bundles further comprising respective flow labels and node labels that specify the at least one common first and second nodal association; and transmitting the bundles to a receiver adapted for filtering of the messages therein responsively to the flow labels and the node labels.

10. The data processing system according to claim 9, wherein each of the flow labels has a first identical fixed length and each of the node labels has a second identical fixed length.

11. The data processing system according to claim 9, wherein the optimization requirements comprise subscription activity of users of the receiver.

12. The data processing system according to claim 9, wherein the optimization requirements comprise requirements of at least one of a computing apparatus and the receiver.

* * * * *